United States Patent
Bugenhagen (10) Patent No.: US 7,889,660 B2
(45) Date of Patent: Feb. 15, 2011

(54) SYSTEM AND METHOD FOR SYNCHRONIZING COUNTERS ON AN ASYNCHRONOUS PACKET COMMUNICATIONS NETWORK

(75) Inventor: Michael K. Bugenhagen, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 0 days.

(21) Appl. No.: 11/894,879

(22) Filed: Aug. 22, 2007

(65) Prior Publication Data

US 2008/0049757 A1    Feb. 28, 2008

Related U.S. Application Data

(60) Provisional application No. 60/839,333, filed on Aug. 22, 2006.

(51) Int. Cl.
    *G06F 11/00* (2006.01)
(52) U.S. Cl. .................... 370/236; 370/252
(58) Field of Classification Search ......... 370/236, 370/406, 400, 235, 468, 229, 252, 390; 709/224, 709/249, 250; 340/2.1, 825.52; 342/352, 342/367, 368
    See application file for complete search history.

(56) References Cited

U.S. PATENT DOCUMENTS

| | | | |
|---|---|---|---|
| 4,612,416 A | 9/1986 | Emerson et al. |
| 4,771,448 A | 9/1988 | Koohgoli et al. |
| 4,831,649 A | 5/1989 | Mejane |
| 5,042,027 A | 8/1991 | Takase et al. |
| 5,132,966 A | 7/1992 | Hayano et al. |
| 5,479,447 A | 12/1995 | Chow et al. |
| 5,521,910 A | 5/1996 | Matthews |
| 5,574,934 A | 11/1996 | Mirashrafi et al. |
| 5,621,663 A | 4/1997 | Skagerling |
| 5,638,514 A | 6/1997 | Yoshida et al. |
| 5,675,578 A | 10/1997 | Gruber et al. |
| 5,680,425 A | 10/1997 | Morzano |
| 5,726,979 A | 3/1998 | Henderson et al. |
| 5,878,097 A | 3/1999 | Hase et al. |
| 5,901,141 A | 5/1999 | Gruber et al. |
| 5,931,679 A | 8/1999 | Funahashi |
| 5,953,318 A | 9/1999 | Nattkemper et al. |

(Continued)

OTHER PUBLICATIONS

PCT International Search Report and Written Opinion for PCT/US07/18549, Date Mailed May 8, 2008.

(Continued)

*Primary Examiner*—Ricky Ngo
*Assistant Examiner*—Chandrahas Patel
(74) *Attorney, Agent, or Firm*—SNR Denton US LLP (57) ABSTRACT

A system and method for monitoring performance of an asynchronous network may include communicating a first network performance data packet including a first indicia over an asynchronous network from a first network node to a second network node. A second network performance data packet including a second indicia may be communicated from the first network node to the second network node. At least one communications data packet may be communicated from the first network node to the second network node between communicating the first and second network performance data packets. At least one performance manager counter at the second network node may be incremented in response to receiving each communications data packet between the first and second network performance data packets.

27 Claims, 3 Drawing Sheets

U.S. PATENT DOCUMENTS

| | | | |
|---|---|---|---|
| 5,963,146 A | 10/1999 | Johnson et al. | |
| 5,970,064 A | 10/1999 | Clark et al. | |
| 6,055,578 A | 4/2000 | Williams et al. | |
| 6,058,102 A | 5/2000 | Drysdale et al. | |
| 6,064,673 A | 5/2000 | Anderson et al. | |
| 6,081,505 A * | 6/2000 | Kilkki | 370/230 |
| 6,115,393 A | 9/2000 | Engel et al. | |
| 6,141,341 A | 10/2000 | Jones et al. | |
| 6,185,198 B1 | 2/2001 | LaDue | |
| 6,201,719 B1 | 3/2001 | He et al. | |
| 6,215,769 B1 | 4/2001 | Ghani et al. | |
| 6,272,151 B1 | 8/2001 | Gupta et al. | |
| 6,282,274 B1 | 8/2001 | Jain et al. | |
| 6,327,677 B1 | 12/2001 | Garg et al. | |
| 6,341,270 B1 | 1/2002 | Esposito et al. | |
| 6,363,056 B1 * | 3/2002 | Beigi et al. | 370/252 |
| 6,370,114 B1 | 4/2002 | Gullicksen et al. | |
| 6,381,221 B1 | 4/2002 | Legouet-Camus et al. | |
| 6,397,359 B1 | 5/2002 | Chandra et al. | |
| 6,404,746 B1 | 6/2002 | Cave et al. | |
| 6,453,359 B1 | 9/2002 | Bender et al. | |
| 6,477,590 B1 | 11/2002 | Habusha et al. | |
| 6,502,131 B1 | 12/2002 | Vaid et al. | |
| 6,529,475 B1 | 3/2003 | Wan et al. | |
| 6,530,032 B1 | 3/2003 | Shew et al. | |
| 6,535,504 B1 | 3/2003 | Johnson et al. | |
| 6,549,946 B1 | 4/2003 | Fisher et al. | |
| 6,597,683 B1 | 7/2003 | Gehring et al. | |
| 6,614,781 B1 | 9/2003 | Elliott et al. | |
| 6,615,261 B1 | 9/2003 | Smorgrav | |
| 6,628,629 B1 | 9/2003 | Jorgensen | |
| 6,646,987 B1 | 11/2003 | Qaddoura | |
| 6,654,803 B1 | 11/2003 | Rochford et al. | |
| 6,657,957 B1 | 12/2003 | Cheung et al. | |
| 6,665,264 B1 | 12/2003 | Davison et al. | |
| 6,684,253 B1 | 1/2004 | Whitaker et al. | |
| 6,690,646 B1 | 2/2004 | Fichou et al. | |
| 6,721,405 B1 | 4/2004 | Nolting et al. | |
| 6,741,563 B2 | 5/2004 | Packer | |
| 6,741,572 B1 | 5/2004 | Graves et al. | |
| 6,748,247 B1 | 6/2004 | Ramakrishnan et al. | |
| 6,751,777 B2 | 6/2004 | Bates et al. | |
| 6,757,255 B1 | 6/2004 | Aoki et al. | |
| 6,763,380 B1 | 7/2004 | Mayton et al. | |
| 6,765,864 B1 | 7/2004 | Natarajan et al. | |
| 6,785,259 B2 | 8/2004 | Le et al. | |
| 6,785,285 B1 | 8/2004 | Romana et al. | |
| 6,798,755 B2 | 9/2004 | Lillie et al. | |
| 6,798,786 B1 | 9/2004 | Lo et al. | |
| 6,804,240 B1 | 10/2004 | Shirakawa et al. | |
| 6,816,463 B2 | 11/2004 | Cooper et al. | |
| 6,839,356 B2 | 1/2005 | Barany et al. | |
| 6,868,094 B1 | 3/2005 | Bordonaro et al. | |
| 6,891,822 B1 | 5/2005 | Gubbi et al. | |
| 6,912,231 B2 | 6/2005 | White et al. | |
| 6,925,060 B2 | 8/2005 | Mangin | |
| 6,934,749 B1 | 8/2005 | Black et al. | |
| 6,940,832 B2 | 9/2005 | Saadawi et al. | |
| 6,944,673 B2 | 9/2005 | Malan et al. | |
| 6,947,379 B1 * | 9/2005 | Gleichauf et al. | 370/229 |
| 6,950,407 B1 | 9/2005 | Huddle | |
| 6,965,614 B1 | 11/2005 | Osterhout et al. | |
| 6,968,374 B2 | 11/2005 | Lemieux et al. | |
| 6,975,617 B2 * | 12/2005 | Walker et al. | 370/349 |
| 6,978,223 B2 | 12/2005 | Milliken | |
| 7,006,526 B1 | 2/2006 | Biedermann | |
| 7,007,107 B1 | 2/2006 | Ivchenko et al. | |
| 7,013,349 B2 | 3/2006 | Idsinga | |
| 7,020,082 B2 | 3/2006 | Bhagavath et al. | |
| 7,020,085 B2 | 3/2006 | Mimura et al. | |
| 7,027,400 B2 | 4/2006 | O'Neill | |
| 7,035,291 B2 | 4/2006 | Grinfeld | |
| 7,039,015 B1 | 5/2006 | Vallone et al. | |
| 7,051,098 B2 | 5/2006 | Masters et al. | |
| 7,058,727 B2 | 6/2006 | Dingsor et al. | |
| 7,061,856 B2 | 6/2006 | Banerjee | |
| 7,082,315 B2 | 7/2006 | Bar-On | |
| 7,088,678 B1 | 8/2006 | Freed et al. | |
| 7,092,696 B1 | 8/2006 | Hosain et al. | |
| 7,099,879 B2 | 8/2006 | Tacaille et al. | |
| 7,100,005 B2 | 8/2006 | Pearl | |
| 7,124,211 B2 | 10/2006 | Dickson et al. | |
| 7,127,617 B2 | 10/2006 | Wiederin et al. | |
| 7,142,516 B2 | 11/2006 | Lev et al. | |
| 7,184,401 B2 | 2/2007 | Foore et al. | |
| 7,184,777 B2 | 2/2007 | Diener et al. | |
| 7,194,002 B2 | 3/2007 | Zhang et al. | |
| 7,197,546 B1 | 3/2007 | Bagga et al. | |
| 7,206,593 B1 | 4/2007 | Yarkosky et al. | |
| 7,209,473 B1 | 4/2007 | Mohaban et al. | |
| 7,222,147 B1 | 5/2007 | Black et al. | |
| 7,222,190 B2 | 5/2007 | Klinker et al. | |
| 7,224,974 B2 | 5/2007 | Benco et al. | |
| 7,246,159 B2 | 7/2007 | Aggarwal et al. | |
| 7,248,604 B2 | 7/2007 | Sugar et al. | |
| 7,260,635 B2 | 8/2007 | Pandya et al. | |
| 7,263,067 B2 | 8/2007 | Sreemanthula et al. | |
| 7,266,122 B1 | 9/2007 | Hogg et al. | |
| 7,266,754 B2 | 9/2007 | Shah et al. | |
| 7,277,913 B2 * | 10/2007 | Kashyap | 709/203 |
| 7,283,474 B1 | 10/2007 | Bergenwall | |
| 7,292,531 B1 | 11/2007 | Hill | |
| 7,307,989 B2 | 12/2007 | Ofek | |
| 7,313,129 B1 | 12/2007 | Bova et al. | |
| 7,349,960 B1 | 3/2008 | Pothier et al. | |
| 7,360,083 B1 | 4/2008 | Ragireddy et al. | |
| 7,369,498 B1 | 5/2008 | Ma et al. | |
| 7,376,731 B2 | 5/2008 | Khan et al. | |
| 7,389,537 B1 | 6/2008 | Callon et al. | |
| 7,406,029 B1 | 7/2008 | Ciancaglini et al. | |
| 7,417,949 B2 | 8/2008 | Weller et al. | |
| 7,460,493 B1 | 12/2008 | Dhanoa et al. | |
| 7,463,634 B1 | 12/2008 | Hansen | |
| 7,471,653 B2 | 12/2008 | McConnell et al. | |
| 7,472,192 B2 | 12/2008 | DeFerranti et al. | |
| 7,477,657 B1 | 1/2009 | Murphy et al. | |
| 7,499,407 B2 | 3/2009 | Holness et al. | |
| 7,502,841 B2 | 3/2009 | Small et al. | |
| 7,505,412 B2 | 3/2009 | Miyake et al. | |
| 7,515,542 B2 | 4/2009 | Hertoghs et al. | |
| 7,519,725 B2 | 4/2009 | Alvarez et al. | |
| 7,535,913 B2 | 5/2009 | Minami et al. | |
| 7,539,241 B1 | 5/2009 | Dick | |
| 7,613,118 B2 | 11/2009 | Appanna et al. | |
| 7,627,627 B2 | 12/2009 | Helliwell et al. | |
| 2002/0015386 A1 | 2/2002 | Kajiwara | |
| 2002/0032871 A1 | 3/2002 | Malan et al. | |
| 2002/0044528 A1 | 4/2002 | Pogrebinsky et al. | |
| 2002/0093948 A1 | 7/2002 | Dertz et al. | |
| 2002/0107966 A1 | 8/2002 | Baudot et al. | |
| 2002/0145998 A1 | 10/2002 | Hagirahim | |
| 2002/0186660 A1 | 12/2002 | Bahadiroglu | |
| 2002/0186665 A1 | 12/2002 | Chaffee et al. | |
| 2002/0191618 A1 | 12/2002 | Mattathil | |
| 2003/0005144 A1 | 1/2003 | Engel et al. | |
| 2003/0046388 A1 | 3/2003 | Milliken | |
| 2003/0067877 A1 | 4/2003 | Sivakumar et al. | |
| 2003/0067884 A1 | 4/2003 | Abler et al. | |
| 2003/0100308 A1 | 5/2003 | Rusch | |
| 2003/0118029 A1 | 6/2003 | Maher, III et al. | |
| 2003/0128692 A1 | 7/2003 | Mitsumori et al. | |
| 2003/0137997 A1 | 7/2003 | Keating | |
| 2003/0142625 A1 | 7/2003 | Wan et al. | |
| 2003/0147386 A1 | 8/2003 | Zhang et al. | |

| | | |
|---|---|---|
| 2003/0172291 A1 | 9/2003 | Judge et al. |
| 2003/0182410 A1 | 9/2003 | Balan et al. |
| 2003/0182432 A1 | 9/2003 | Lawson |
| 2003/0189900 A1 | 10/2003 | Barany et al. |
| 2003/0198187 A1 | 10/2003 | Mellquist et al. |
| 2003/0198209 A1 | 10/2003 | Schwengler et al. |
| 2003/0235209 A1 | 12/2003 | Garg et al. |
| 2004/0034793 A1 | 2/2004 | Yuan |
| 2004/0049596 A1 | 3/2004 | Schuehler et al. |
| 2004/0054680 A1 | 3/2004 | Kelley et al. |
| 2004/0098473 A1 | 5/2004 | Yodaiken |
| 2004/0101302 A1 | 5/2004 | Kim et al. |
| 2004/0110507 A1 | 6/2004 | Ramakrishnan et al. |
| 2004/0117502 A1 | 6/2004 | Rosengard et al. |
| 2004/0139106 A1 | 7/2004 | Bachman et al. |
| 2004/0153382 A1 | 8/2004 | Boccuzzi et al. |
| 2004/0155899 A1 | 8/2004 | Conrad |
| 2004/0158704 A1 | 8/2004 | Oates et al. |
| 2004/0160979 A1 | 8/2004 | Pepin et al. |
| 2004/0230572 A1 | 11/2004 | Omoigui |
| 2004/0240454 A1 | 12/2004 | Yamauchi et al. |
| 2004/0246895 A1 | 12/2004 | Feyerabend |
| 2004/0252718 A1 | 12/2004 | Miyamoto |
| 2004/0258226 A1 | 12/2004 | Host |
| 2004/0261116 A1 | 12/2004 | McKeown et al. |
| 2004/0264961 A1 | 12/2004 | Nam et al. |
| 2005/0002331 A1 | 1/2005 | Nolle et al. |
| 2005/0025059 A1 | 2/2005 | Rajan et al. |
| 2005/0027851 A1 | 2/2005 | McKeown et al. |
| 2005/0027870 A1 | 2/2005 | Trebes, Jr. |
| 2005/0043026 A1 | 2/2005 | Brok et al. |
| 2005/0071494 A1 | 3/2005 | Rundquist et al. |
| 2005/0089040 A1 | 4/2005 | Kim |
| 2005/0089043 A1 | 4/2005 | Seckin et al. |
| 2005/0138517 A1 | 6/2005 | Monitzer |
| 2005/0169186 A1 | 8/2005 | Qiu et al. |
| 2005/0181814 A1 | 8/2005 | Okamoto et al. |
| 2005/0204162 A1 | 9/2005 | Rayes et al. |
| 2005/0223097 A1 | 10/2005 | Ramsayer et al. |
| 2005/0228885 A1 | 10/2005 | Winfield et al. |
| 2005/0235058 A1 | 10/2005 | Rackus et al. |
| 2005/0238026 A1 | 10/2005 | Wu et al. |
| 2005/0249124 A1 | 11/2005 | Elie-Dit-Cosaque et al. |
| 2005/0249206 A1 | 11/2005 | Wybenga et al. |
| 2005/0254435 A1 | 11/2005 | Moakley et al. |
| 2005/0260993 A1 | 11/2005 | Lovell |
| 2005/0262240 A1 | 11/2005 | Drees et al. |
| 2006/0002370 A1 | 1/2006 | Rabie et al. |
| 2006/0015773 A1 | 1/2006 | Singh et al. |
| 2006/0020700 A1 | 1/2006 | Qiu et al. |
| 2006/0023638 A1 | 2/2006 | Monaco et al. |
| 2006/0023642 A1 | 2/2006 | Roskowski et al. |
| 2006/0072555 A1 | 4/2006 | St. Hilaire et al. |
| 2006/0094440 A1 | 5/2006 | Meier et al. |
| 2006/0104264 A1 | 5/2006 | Cho |
| 2006/0109839 A1 | 5/2006 | Hino et al. |
| 2006/0114818 A1 | 6/2006 | Canali et al. |
| 2006/0114888 A1 | 6/2006 | Schuman |
| 2006/0143098 A1 | 6/2006 | Lazaridis |
| 2006/0159008 A1 | 7/2006 | Sridhar et al. |
| 2006/0164982 A1 | 7/2006 | Arora et al. |
| 2006/0205410 A1 | 9/2006 | Black |
| 2006/0209685 A1 | 9/2006 | Rahman et al. |
| 2006/0239204 A1 | 10/2006 | Bordonaro et al. |
| 2006/0242309 A1 | 10/2006 | Damick et al. |
| 2006/0244818 A1 | 11/2006 | Majors et al. |
| 2006/0245369 A1 | 11/2006 | Schimmelpfeng et al. |
| 2006/0262772 A1 | 11/2006 | Guichard et al. |
| 2006/0271677 A1 | 11/2006 | Mercier |
| 2006/0285501 A1 | 12/2006 | Damm |
| 2007/0025255 A1 | 2/2007 | Noble |
| 2007/0025258 A1 | 2/2007 | Chen |
| 2007/0036151 A1 | 2/2007 | Baeder |
| 2007/0076754 A1 | 4/2007 | Krishnaswamy |
| 2007/0097985 A1 | 5/2007 | Lee |
| 2007/0117538 A1 | 5/2007 | Weiser et al. |
| 2007/0133403 A1 | 6/2007 | Hepworth et al. |
| 2007/0140301 A1 | 6/2007 | Kailash et al. |
| 2007/0147247 A1 | 6/2007 | Kalonji et al. |
| 2007/0171937 A1 | 7/2007 | Boatright et al. |
| 2007/0180142 A1 | 8/2007 | Small et al. |
| 2007/0201485 A1 | 8/2007 | Rabipour |
| 2007/0211717 A1 | 9/2007 | Capps et al. |
| 2007/0223388 A1 | 9/2007 | Arad et al. |
| 2007/0263535 A1* | 11/2007 | Shabtay .................. 370/230 |
| 2007/0268817 A1 | 11/2007 | Smallegange et al. |
| 2008/0002669 A1 | 1/2008 | O'Brien et al. |
| 2008/0013531 A1 | 1/2008 | Elliott et al. |
| 2008/0014908 A1 | 1/2008 | Vasant |
| 2008/0043716 A1 | 2/2008 | Toombs et al. |
| 2008/0049625 A1 | 2/2008 | Edwards et al. |
| 2008/0049637 A1 | 2/2008 | Morrill et al. |
| 2008/0049745 A1 | 2/2008 | Edwards et al. |
| 2008/0049775 A1 | 2/2008 | Morrill et al. |
| 2008/0062986 A1 | 3/2008 | Shand et al. |
| 2008/0101364 A1 | 5/2008 | Chow et al. |
| 2008/0112333 A1 | 5/2008 | Busch et al. |
| 2008/0279183 A1 | 11/2008 | Wiley et al. |
| 2009/0059881 A1 | 3/2009 | Theobold et al. |
| 2009/0086649 A1 | 4/2009 | Van Der Burg et al. |
| 2009/0116497 A1 | 5/2009 | Varma et al. |
| 2009/0201828 A1 | 8/2009 | Samuels et al. |

OTHER PUBLICATIONS

PCT International Search Report and Written Opinion for PCT/US07/15311, Date Mailed Apr. 21, 2008.
PCT International Search Report and Written Opinion for PCT/US07/15299, Date Mailed Feb. 6, 2008.
PCT International Search Report and Written Opinion for PCT/US07/15203, Date Mailed Feb. 5, 2008.
PCT International Search Report and Written Opinion for PCT/US07/15252, Date Mailed Mar. 21, 2008.
PCT International Search Report and Written Opinion for PCT/US07/81980, Date Mailed Mar. 11, 2008.
ITU-T Newslog, Operators Given Performance Management for Ethernet with New Standard, [Retrieved from ITU-T Newslog, <URL:http://www.itu.int/ITU-T/newslog/default, date, Feb. 8, 2006, aspx>] Feb. 6, 2006.
PCT International Search Report and Written Opinion for PCT/US07/81971, Date Mailed Mar. 11, 2008.
PCT International Search Report and Written Opinion for PCT/US07/18549, Date Mailed May 8, 2008.
U.S. Non-Final Office Action Dated Jul. 9, 2008; U.S. Appl. No. 11/479,751, filed Jun. 30, 2006.
Fujitsu: Ethernet Service OAM; Overview, Applications, Deployment, and Issues; publication date: Mar. 2, 2006.
Ng, See Leng et al. "End-to-end Based QoS provisioning in an ALL-IP Network" Sep. 23-26, 2005.
Manousos, Michael et al. "Voice-Quality Monitoring and Control of VOIP" Jul. 2005.
www.sipcenter.com "What is SIP?" Jun. 2001.
Pangalos, P.A. et al "End-to-end SIP based real time application adaptation during unplanned vertical handovers," Global Telecommunications Conference, 2001. GLOBECOM '01.IEEE, vol. 6, no., pp. 3488-3493 vol. 6, 2001.
Yoshimura, T. et al. "Rate and robustness control with RTP monitoring agent for mobile multimedia streaming," Communications, 2002. ICC 2002. IEEE International Conference on, vol. 4, no., pp. 2513-2517 vol. 4, 2002.
J. Rosenburg et al. "SIP: Session Initiation Protocol" IETF RFC 3261, Jun. 2002.
International Telecommunication Union, H.323 Series H. Audiovisual and Multimedia Systems, Infrastructure of audiovisual services—Systems and terminal equipment for audiovisual services—Visual telephone systems and equipment for local area networks which provide a non-guaranteed quality of service, Nov. 1996, ITU; cover page, pp. i-v, pages.
Non-Final Office Action date mailed Jul. 9, 2008 for U.S. Appl. No. 11/479,751.
Response filed Nov. 7, 2008 Non-Final Office Action date mailed Jul. 9, 2008 for U.S. Appl. No. 11/479,751.
Final Office Action date mailed Jan. 23, 2009 for U.S Appl. No. 11/479,751.
RCE/Response filed May 27, 2009 Final Office Action date mailed Jan. 23, 2009 for U.S. Appl. No. 11/479,751.
Non-Final Office Action date mailed Aug. 20, 2009 for U.S. Appl. No. 11/479,751.
Non-Final Office Action date mailed Sep. 1, 2009 for U.S. Appl. No. 11/809,404.
Non-Final Office Action date mailed Aug. 17, 2009 for U.S. Appl. No. 11/809,405.
Non-Final Office Action date mailed Sep. 9, 2009 for U.S. Appl. No. 11/809,911.
Non-Final Office Action date mailed Feb. 17, 2009 for U.S. Appl. No. 11/583,765.
Response filed May 18, 2009 Non-Final Office Action date mailed Feb. 17, 2009 for U.S. Appl. No. 11/583,765.
Non-Final Office Action date mailed Jun. 11, 2009 for U.S. Appl. No. 11/586,169.
Non-Final Office Action date mailed Aug. 6, 2009 for U.S. Appl. No. 11/809,398.
Non-Final Office Action date mailed Aug. 6, 2009 for U.S. Appl. No. 11/809,912.
Non-Final Office Action date mailed Mar. 30, 2009 for U.S. Appl. No. 11/583,288.
Response filed May 18, 2009 to Non-Final Office Action date mailed Mar. 30, 2009 for U.S. Appl. No. 11/583,288.
Non-Final Office Action date mailed Jun. 23, 2009 for U.S. Appl. No. 11/809,535.
Non-Final Office Action date mailed Aug. 17, 2009 for U.S. Appl. No. 11/809,917.
Non-Final Office Action date mailed Jun. 11, 2009 for U.S. Appl. No. 11/809,402.
Response filed Sep. 9, 2009 to Non-Final Office Action date mailed Jun. 11, 2009 for U.S. Appl. No. 11/809,402.
Non-Final Office Action date mailed Jun. 25, 2009 for U.S. Appl. No. 11/809,408.
Non-Final Office Action date mailed Nov. 12, 2008 for U.S. Appl. No. 11/809,395.
Response filed Apr. 13, 2009 to Non-Final Office Action date mailed Nov. 12, 2008 for U.S. Appl. No. 11/809,395.
Final Office Action date mailed Aug. 7, 2009 for U.S. Appl. No. 11/809,395.
Non-Final Office Action date mailed Nov. 14, 2008 for U.S. Appl. No. 11/809,913.
Response filed Apr. 14, 2009 to Non-Final Office Action date mailed Nov. 14, 2008 for U.S. Appl. No. 11/809,913.
Final Office Action date mailed Jul. 8, 2009 for U.S. Appl. No. 11/809,913.
Non-Final Office Action date mailed Jun. 11, 2009 for U.S. Appl. No. 11/809,407.
Response filed Sep. 9, 2009 to Non-Final Office Action date mailed Jun. 11, 2009 for U.S. Appl. No. 11/809,407.
Non-Final Office Action date mailed Jun. 10, 2009 for U.S. Appl. No. 11/809,394.
Response filed Sep. 9, 2009 to Non-Final Office Action date mailed Jun. 10, 2009 for U.S. Appl. No. 11/809,394.
Non-Final Office Action date mailed Jul. 23, 2009 for U.S. Appl. No. 11/809,883.
Non-Final Office Action date mailed Aug. 6, 2009 for U.S. Appl. No. 11/809,884.
Non-Final Office Action date mailed Aug. 20, 2009 for U.S. Appl. No. 11/809,915.
Non-Final Office Action date mailed Aug. 5, 2009 for U.S. Appl. No. 11/809,888.
Non-Final Office Action date mailed Jun. 11, 2009 for U.S. Appl. No. 11/809,403.
Response filed Sep. 10, 2009 to Non-Final Office Action date mailed Jun. 11, 2009 for U.S. Appl. No. 11/809,403.
Non-Final Office Action date mailed Oct. 1, 2009 for U.S. Appl. No. 11/809,910.
Non-Final Office Action date mailed Oct. 5, 2009 for U.S. Appl. No. 11/809,916.
RCE/Response filed Sep. 30, 2009 to Final Office Action date mailed Jul. 8, 2009 for U.S. Appl. No. 11/809,913.
Response after final filed Sep. 30, 2009 to Final Office Action date mailed Aug. 7, 2009 for U.S. Appl. No. 11/809,395.
Final Office Action date mailed Feb. 25, 2010 for U.S. Appl. No. 11/479,751.
Final Office Action date mailed Mar. 18, 2010 for U.S. Appl. No. 11/809,404.
Notice of Allowance date mailed Mar. 29, 2010 for U.S. Appl. No. 11/809,405.
Response filed Mar. 4, 2010 for U.S. Appl. No. 11/809,396.
Response filed Mar. 4, 2010 for U.S. Appl. No. 11/583,765.
Non-Final Office Action date mailed Feb. 4, 2010 for U.S. Appl. No. 11/809,917.
Response filed Mar. 1, 2010 for U.S. Appl. No. 11/809,402.
Advisory Action date mailed Mar. 16, 2010 for U.S. Appl. No. 11/809,402.
Response filed Mar. 4, 2010 for U.S. Appl. No. 11/809,913.
Non-Final Office Action date mailed Feb. 25, 2010 for U.S. Appl. No. 11/809,407.
Non-Final Office Action date mailed Feb. 19, 2010 for U.S. Appl. No. 11/809,394.
RCE/Response filed Mar. 9, 2010 for U.S. Appl. No. 11/809,883.
Final Office Action date mailed Feb. 22, 2010 for U.S. Appl. No. 11/809,884.
Final Office Action date mailed Mar. 9, 2010 for U.S. Appl. No. 11/809,915.
Non-Final Office Action date mailed Feb. 3, 2010 for U.S. Appl. No. 11/809,914.
Non-Final Office Action date mailed Mar. 26, 2010 for U.S. Appl. No. 11/809,534.
Response filed Feb. 2, 2010 for U.S. Appl. No. 11/809,403.
Advisory Action date mailed Feb. 19, 2010 for U.S. Appl. No. 11/809,403.
RCE/Response filed Mar. 8, 2010 for U.S. Appl. No. 11/809,403.
Non-Final Office Action date mailed Mar. 2, 2010 for U.S. Appl. No. 11/809,532.
Newton, Harry "Newton's Telecom Dictionary" $23^{rd}$ Edition 2007.
Response filed Dec. 10, 2009 for U.S. Appl. No. 11/479,751.
Response filed Dec. 1, 2009 for U.S. Appl. No. 11/809,404.
Response filed Nov. 17, 2009 for U.S. Appl. No. 11/809,405.
Non-Final Office Action date mailed Dec. 28, 2009 for U.S. Appl. No. 11/809,396.
Response filed Dec. 9, 2009 for U.S. Appl. No. 11/809,911.
Final Office Action date mailed Sep. 16, 2009 for U.S. Appl. No. 11/583,765.
RCE/Response filed Dec. 15, 2009 for U.S. Appl. No. 11/583,765.
Non-Final Office Action date mailed Jan. 21, 2010 for U.S. Appl. No. 11/583,765.
Response filed Sep. 9, 2009 for U.S. Appl. No. 11/586,169.
Final Office Action date mailed Jan. 22, 2010 for U.S. Appl. No. 11/586,169.
Response filed Dec. 7, 2009 for U.S. Appl. No. 11/809,398.
Non-Final Office Action date mailed Oct. 13, 2009 for U.S. Appl. No. 11/809,539.
Response filed Jan. 13, 2010 for U.S. Appl. No. 11/809,539.
Response filed Dec. 9, 2009 for U.S. Appl. No. 11/809,912.
Non-Final Office Action date mailed Oct. 27, 2009 for U.S. Appl. No. 11/583,288.
Response filed Jan. 7, 2010 for U.S. Appl. No. 11/583,288.
Response filed Sep. 22, 2009 for U.S. Appl. No. 11/809,535.
Final Office Action date mailed Dec. 28, 2009 for U.S. Appl. No. 11/809,535.
Response filed Oct. 7, 2009 for U.S. Appl. No. 11/809,917.
Final Office Action date mailed Dec. 1, 2009 for U.S. Appl. No. 11/809,402.
Advisory Action filed Jan. 29, 2010 for U.S. Appl. No. 11/809,402.

Response filed Sep. 21, 2009 for U.S. Appl. No. 11/809,408.
Final Office Action date mailed Jan. 21, 2010 for U.S. Appl. No. 11/809,408.
Non-Final Office Action date mailed Feb. 1, 2010 for U.S. Appl. No. 11/809,397.
Non-Final Office Action date mailed Sep. 21, 2009 for U.S. Appl. No. 11/809,887.
Response filed Jan. 12, 2010 for U.S. Appl. No. 11/809,887.
Amendment after Final filed Sep. 30, 2009 for U.S. Appl. No. 11/809,395.
Advisory Action date mailed Oct. 20, 2009 for U.S. Appl. No. 11/809,395.
Amendment after Final filed Oct. 20, 2009 for U.S. Appl. No. 11/809,395.
Amendment after Final filed Dec. 7, 2009 for U.S. Appl. No. 11/809,395.
Notice of Allowance date mailed Jan. 5, 2010 for U.S. Appl. No. 11/809,395.
RCE/Amendment filed Sep. 30, 2009 for U.S. Appl. No. 11/809,913.
Non-Final Office Action date mailed Dec. 7, 2009 for U.S. Appl. No. 11/809,913.
Final Office Action date mailed Dec. 15, 2009 for U.S. Appl. No. 11/809,407.
RCE/Response filed Feb. 2, 2010 for U.S. Appl. No. 11/809,407.
Final Office Action date mailed Nov. 25, 2009 for U.S. Appl. No. 11/809,394.
RCE/Amendment filed Jan. 20, 2010 for U.S. Appl. No. 11/809,394.
Advisory Action date mailed Jan. 20, 2010 for U.S. Appl. No. 11/809,394.
RCE/Amendment filed Jan. 28, 2010 for U.S. Appl. No. 11/809,394.
Response filed Sep. 30, 2009 for U.S. Appl. No. 11/809,883.
Final Office Action date mailed Dec. 21, 2009 for U.S. Appl. No. 11/809,883.
Response filed Dec. 29, 2009 for U.S. Appl. No. 11/809,910.
Non-Final Office Action date mailed Jan. 15, 2010 for U.S. Appl. No. 11/809,393.
Response filed Dec. 7, 2009 for U.S. Appl. No. 11/809,884.
Non-Final Office Action date mailed Jan. 21, 2010 for U.S. Appl. No. 11/809,401.
Response filed Nov. 20, 2009 for U.S. Appl. No. 11/809,915.
Response filed Nov. 5, 2009 for U.S. Appl. No. 11/809,888.
Response filed Jan. 5, 2010 for U.S. Appl. No. 11/809,916.
Final Office Action date mailed Dec. 9, 2009 for U.S. Appl. No. 11/809,403.
Non-Final Office Action date mailed Dec. 30, 2009 for U.S. Appl. No. 11/809,885.
Response filed Jan. 25, 2010 for U.S. Appl. No. 11/809,885.

* cited by examiner

SYSTEM AND METHOD FOR SYNCHRONIZING COUNTERS ON AN ASYNCHRONOUS PACKET COMMUNICATIONS NETWORK

CROSS REFERENCE TO RELATED APPLICATIONS

This Application claims priority from U.S. Provisional Patent Application having Ser. No. 60/839,333 filed on Aug. 22, 2006, the entire teachings of which are herein incorporated by reference.

BACKGROUND

Communications networks are used for a wide variety of purposes, including communicating voice and data. There are many types of communications networks that are capable of communicating voice and data, including synchronous communications networks, which often use time division multiplexing (TDM) as a communications protocol to maintain timing synchronization at each circuit in the network, and asynchronous communications networks, which do not use a communications protocol that maintains timing synchronization. Performance Management (PM) tracking may be enabled by the nature of the communications network itself. In TDM communications networks, the base functionality of the synchronous "time division multiplexing" at a known rate provides measurable increments. In other words, the amount of data sent and received in a given time period is known by virtue of the rate of a TDM circuit and time period or window of the measurement. The time window between the ends of a circuit is synchronized by a time of day clock signal for data correlation of events in time. Each clock tick contains one and only one packet, and each packet may be checked for integrity so that over any time frame the errors may be recorded in any multiple of the timing clock desirable.

With non-synchronous packet systems, however, there are multiple system fundamental elements missing that impede accurate PM monitoring.

First, there is no end-to-end timing synchronization with Ethernet, although time-of-day synchronization may be provided by a network time protocol (NTP), which is the oldest time protocol operating on the Internet.

Second, packet sizes and transmission utilization (i.e., bandwidth use) may both vary and can be zero, while TDM bit rates are constant and, by definition, cannot be zero.

Third, packet switching and switching systems can be impacted by the over-subscription of traffic placed on them, whereas TDM systems are synchronized in a non-blocking way so as to not add transmission delay or drop data in nodes between physical media segments (e.g., fiber or copper). Furthermore, a packet communications system can experience variable data rates and lost packets as a normal system performance characteristic. Additionally, heavy over-subscription invokes QOS (Quality of Service) to manage congestion, which causes packet discard as a known characteristic.

Fourth, TDM packets contain no routing or switching information so they are passed through the TDM elements at line rate. In a packet based communications network, each packet may be evaluated by a routing or switching engine and transmitted at a packet matrix transmission rate. Because of the evaluation of each packet, line delay may be added during communication. The net effect of the added delay creates a situation where packets between the ends of the circuit are "in-flight" and do not arrive at known intervals. An analogous problem occurs in counting sporadic vehicles in traffic passing by two bridges that are located five miles apart. If, for example, a tally is made of the number of cars passing each bridge every 30 seconds, but without correlation as to which car the count started, there are typically some cars "in flight" between the bridges that are not counted at the second bridge. This same "in flight" problem exists with asynchronous networks and is compounded when considering distance and the fact that an Internet protocol (IP) network may be used to retrieve performance manager (PM) counters from the far ends of a circuit. Even if an element management system (EMS) or call control manager (CCM) that issues a request for a PM measurement to the ends of the circuit may be equidistant from each end, there may be no guarantee that the data time in flight may be the same on both ends of the network. This time difference may be nearly assured when the EMS system may be located much closer to one end of a circuit than it may be to the other and the measurement request experiences different transit times.

Fifth, service level agreement metrics are currently obtained by correlating the Ethernet or IP frames transmitted from one end of a customer circuit to a far end, which occurs in both directions as Ethernet and IP are uni-directional. Managing service level agreement metrics creates a load to a central processing unit (CPU) in the EMS system that may be correlating the transmitted and received packets from both ends of each circuit.

Accurate transmission performance management includes the ability to (i) track the amount of data received during a time window that correlates to the amount of data that the far end transmitted using performance counters, (ii) determine amount of data that the far end transmitted over a time window over which the data measurement occurred, and (iii) record those time windows into larger performance incremental counters. Managing these performance counters at a centralized system can be challenging given the number of network nodes and user network interfaces involved in a large scale network such as the Internet.

SUMMARY

To enable a performance management system of large scale networks to monitor performance of data packets being communicated over an asynchronous network the principles of the present invention provide for specially marked packets to be communicated over an asynchronous network thereby enabling network nodes when to start and stop counting. In addition, PM counters at each network node may be synchronized, thereby providing for accurate counting of network performance and the ability to prevent counter rollover.

One embodiment of a system for monitoring performance of an asynchronous network may include a first network node including at least one first performance manager counter for counting data packets communicated over an asynchronous communications network and a second network node including at least one second performance manager counter for counting data packets communicated over the asynchronous communications network. The first network node may be configured to communicate (i) a first network performance data packet including a first indicia to the second network node, (ii) a second network performance data packet including a second indicia to the second network node, and (iii) at least one communications data packet to the second network node between the first and second network performance data packets. The second network node may increment the second performance manager counter(s) in response to receiving each communications data packet between the first and second network performance data packets.

One embodiment of a method for monitoring performance of an asynchronous network may include communicating a first network performance data packet including a first indicia over an asynchronous network from a first network node to a second network node. A second network performance data packet including a second indicia may be communicated from the first network node to the second network node. At least one communications data packet may be communicated from the first network node to the second network node between communicating the first and second network performance data packets. At least one performance manager counter at the second network node may be incremented in response to receiving each communications data packet between the first and second network performance data packets.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
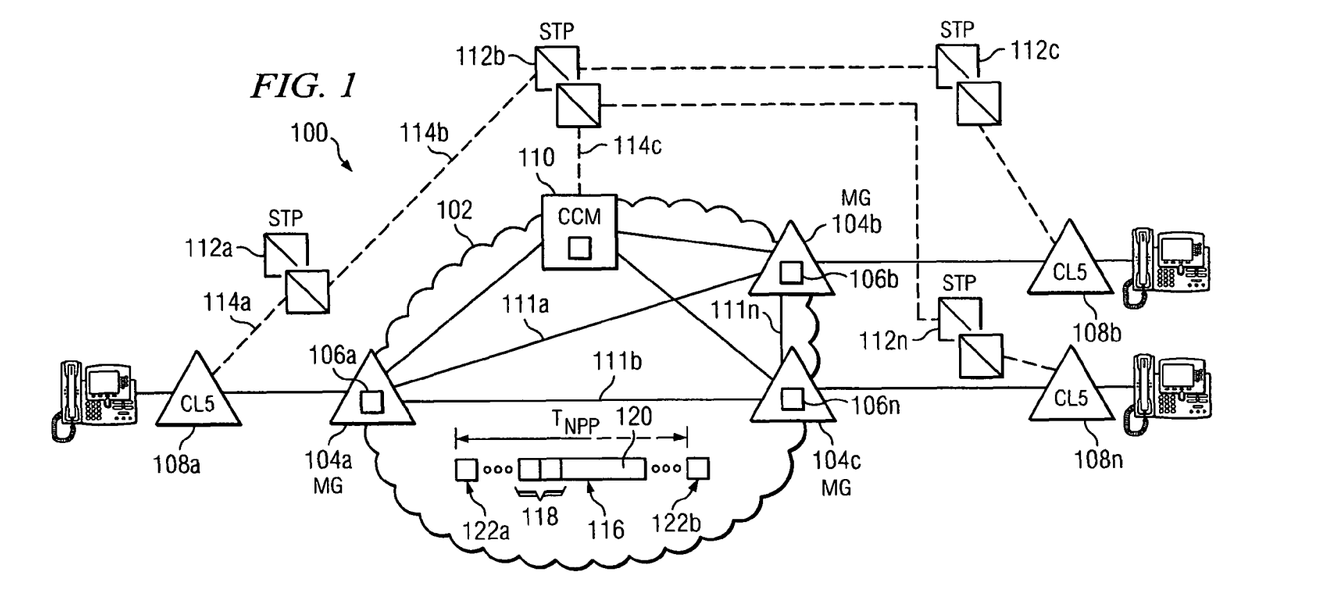
FIG. 1 is a block diagram of an exemplary asynchronous communications network.

FIG. 1 is a block diagram of an exemplary communications network 100. The communications network 100 is configured to communicate both voice and data. The communications network 100 may include an asynchronous packet network 102 and may include media gateways 104a-104n (collectively 104) that are configured to translate data from a first protocol to a second communications protocol to enable data to be communicated between different networks or devices that use different communications protocols. Each media gateway 104 may execute a respective transmission performance unit 106a-106n (collectively 106) that is used to generate transmission performance information from data packets being received at a respective media gateway. Other network nodes, such as routers, may also operate on the packet network 102 and utilize transmission performance units for generating transmission performance information.

The media gateways 104 may be in communication with class 5 switches 108a-108n (collectively 108). The class 5 switches 108 are local switches maintained by local telephone communications service providers to provide local telephone communications services. The class 5 switches 108 may communicate data packets in a first communications protocol, such as time division multiplexing, and the media gateways 104 may convert the data packets in the first communications protocol into a second communications protocol, such as an asynchronous transfer mode (ATM) protocol for communication over the packet network 102.

A call control manager 110 may be in communication with the media gateways 104 and other network nodes via communication paths 111a-111n to manage packet communications over the packet network 102. Signaling system #7 (SS7) communications may be utilized to provide control of communications using out-of-band (i.e., not in a voice band) communications of control commands between the class 5 switches 108 and call control manager 110. Signaling transfer points (STPs) 112a-112n (collectively 112) may be in communication with the class 5 switches 108 and CCM 110 via communication paths 114a-114n. The STPs 112 may be utilized to enable SS7 communications between the class 5 switches 108 and CCM 110 to enable the CCM 110 to manage packet communications over the packet network 102 faster than using in-band control signaling.

Data packet 116 may include a header portion 118 and a payload portion 120. The header portion may include a destination address and an origination address, where each of the addresses represents an address of an end user communication device (e.g., telephone). The payload portion 120 may include digitized voice information or music information, for example. As understood in the art, the data packet 116 is communicated asynchronously amongst other data packets being communicated over the packet network 102. As further understood in the art, the payload portion may include real-time content and non-real-time content.

Real-time content is data produced by applications that use real-time and near-real-time data packet communications (e.g., VoIP telephone calls). Data packets including real-time content (i.e., real-time data packets) may include payload data representative of speech during a telephone call, video data stream during a live event, music stream during a live concert or live radio broadcast, or gaming data, possibly including embedded voice, during a competitive live gaming session, for example. Non-real-time data packets may include payload data representative of content that does not need to be communicated in real-time (e.g., music download, webpage content, program update download, etc.).

To enable the packet network 102 to generate performance information of communications over the packet network 102, network performance data packets or network performance packets (NPP) 122a and 122b (collectively 122) may be generated and communicated over the packet network 102. The NPP packets 122 shown are data packets that may be communicated in-band along a bearer path of the packet network 102. However, the NPP packets 122 may also be communicated out-of-band between network elements of the packet network to provide network performance information to other switching and control systems via control signaling over an operational support network or other operations or maintenance network.

NPP packets 122 may be communicated between nodes of the packet network 102 to establish windows of time in which a node collects or determines network performance information, which may be any information that describes packet utilization and performance of a node, node segment, transmission path, or network element. More particularly, each NPP packet may have a timestamp, counter, sequence number, or other identifier to enable the use of the NPP packet by a network node to establish a sampling window of time for collecting or determining network performance information. Alternatively, NPP packets may not include such identifier and may instead be generated at regular intervals between nodes of the packet network 102. Each network node or path transmission point may transmit NPP packets to a far-end element via the packet transmission path and the far-end element may receive, calculate performance, and store the information for use as utilization and performance measurement or network performance information. Each communication path may contain information from its transmission to receive paths. The end-points may exchange and track the measures of the bi-directional path via relaying those measures at either given intervals or any other mechanism so that at least one end of the communication path has both the transmit and receive path utilization and performance measurements. The NPP packet 116 may provide a "heartbeat" between network nodes, such as MG 104a and MG 104n, by which the network nodes may use to determine the network performance. NPP packets 122 may also be used to communicate the collected or determined network performance information between nodes of the network by, for example, including the network performance information in the header or payload portion of the NPP packets 122. In one embodiment, an NPP packet is an Ethernet Connectivity Fault Management (CFM) packet, such as an 802.1ag packet, and a receiving utilization and performance tracking mechanism may be an ITU Y.1731 protocol stack. However, any packet of data may be utilized under any suitable protocol, as well as calculation methodology to track and store the network performance information.

The NPP packets 122 may be formatted to include any information capable of providing information to network nodes to determine network performance information, where the network performance information may include transmission rate, transmission quality, and/or transmission connectivity. Other network performance information, such as communication path utilization, may additionally be determined.

NPP packets 122 may enable network nodes at the far-end (i.e., receiving end) to generate network performance information. The NPP packets 122 may be communicated every $T_{NPP}$ seconds, where $T_{NPP}$ may be less than, equal to, or higher than one second and include a timestamp of the time of communication and a counter value indicating the number of packets previously sent to enable a receiving network node to determine whether any data packets were lost between successive NPP packets 122.

Transmission rate is an indication of the number of data packets communicated over a time period and can be determined by counting data packets, such as data packet 116, communicated over a network segment during a time period, for example. The NPP data packets 122 may be used in determining or otherwise establishing a time period over which to measure the transmission rate.

Transmission quality is a measure of link state and may include various link state parameters, including bandwidth utilization, packet loss, jitter, and delay, for example. In one embodiment, the NPP packets 122 may be communicated over Layer 2 of the OSI model and the network performance information may be determined in Layer 2.

Transmission connectivity is an indication of communications between two devices on a network. The connectivity may be indicative of signal strength of communications between the devices, an on/off indication of a device being off or otherwise incapable of communicating, or other suitable performance measures. The transmission performance units 106 may generate network performance information in association with the NPP data packets 122.

Network performance information may also include information associated with non-packet networks, such as cable DOCSIS, wireless CDMA, TDMA, WiMax, or circuit based networks. Without limiting the foregoing, network performance information may include any data that is associated with any wired or wireless network that may be indicative of or otherwise suitable for use in determining the operation or general health of the network. Network performance information may also include information that is not associated with the communication of data between network elements along connection paths, but is instead associated with the performance of network devices themselves located at a particular node of the network. For example, network performance information may indicate buffer utilization levels, buffer overflows, errors experienced in caching or queuing data, latency introduced by a lack of processing, packet loss across a switching fabric of a particular network device such as a switch and router, or any other performance issue associated with a particular network device. It should be understood that different network types and different connection paths may have different indicia of network performance issues. For example, a T1 line may not have data associated with packet loss, jitter, or latency but may instead only present alarms of red, yellow, or green associated with the perceived performance along a T1 connection path. Similarly, there may be a large amount of data associated with wireless networks that are indicative of network performance such as signal to noise ratio, levels of interference, signal strength, or any other suitable data regarding the performance of the wireless network that may be useful and utilized as network performance information.

Continuing with FIG. 1, in addition to generating network performance information based on NPP data packets, the principles of the present invention provide for the network nodes, such as MGs 104, to determine real-time transmission rate or real-time traffic utilization (i.e., a number of kbits per second, or a number of data packets including real-time content being communicated over network segments during a time period). Real-time bandwidth use may be determined by tracking the summation of the size of each real-time packet that is transmitted in a given time period, collectively. Alternatively, a real-time packet transmission rate may be equal to the number of real-time packets multiplied by the, average packet size with the product divided by the given time period. As described above, real-time content is data produced by applications that use real-time and near-real-time data packet communications (e.g., VoIP telephone calls).

Determining bandwidth usage, both real-time and total bandwidth usage, can be accomplished by tracking either individual data packets and packet flows or internal network element traffic statistics. Collecting the amount of real-time and or total bandwidth usage may be performed in a number of ways, including examining a priority bit marking ('P' bit), type of service (TOS) bit marking, virtual local area network Class of Service (COS) marking, Virtual Circuit (layer 2 addressing), IP address and/or port. Additionally, probes, queuing, schedulers, buses, or path metrics may also be used with any other information associated with a data packet that is capable of indicating whether one or more data packets are real-time or non-real-time to collect real-time and non-real-time bandwidth usage. For example, accessing other in-use protocol stacks via probes or "cross stack" communication can provide information from real-time control protocols, such as Real Time Protocol (RTP) and Real Time Control Protocol (RTCP). Real-time protocol packets may be used to identify real-time bandwidth rate of communication sessions data packets. By determining bandwidth of real-time and total data packets, and optionally other network performance information, call control manager 110 may manage network communications sessions in a more intelligent manner. Determining transmission rates may be performed at Layer 1 or Layer 2 of the OSI model. However, it should be understood that determining the network performance information may be performed on a different layer if information is available on the different layers to provide enough information to determine bandwidth utilization of real-time and total data packets being communicated over a node segment. These segments may be a shared path resource as in a media gateway to media gateway path, pin-hole firewall access node path, or they could be to a single subscriber end-point or intermediate trunking point. It is understood that multiple communications devices share the same transmission path and no single session controller may have knowledge of the in-use real-time data packet counts or bandwidth state without this information being derived from the use of NPP packets 122.

Continuing with FIG. 1, the transmission performance collection units 106 may include one or more modules to determine the network performance information, both with respect to the communication of real-time content and non-real-time content, number of real-time sessions, packet loss rate, jitter, delay, etc. The module(s) may be in the form of software executed by one or more processors, hardware (e.g., ASIC chips), external probes, firmware, or a combination of hardware and software, as understood in the art. The modules may be configured to count the number of bits, or the number and size of total data packets and bandwidth of real-time data packets and non-real-time data packets that are being communicated over a node segment (i.e., one or more communications links between two network nodes or connections, processes, or components within a network node), also referred to herein as a network segment. A communications path may include one or more node segments. Counts may include data packets and real-time packets with and/or without error rate. It should be understood that counting non-real-time data packets is equivalent to counting real-time data packets and total bandwidth because real-time data packets may be determined by subtracting non-real-time data packets from total data packets and bandwidth. In one embodiment, multiple channels may be utilized to communicate real-time data packets and non-real-time data packets along different paths through one or more devices and communications paths. Channels may include virtual or physical paths constructed of ports, buses, schedulers, shift registers, cards, and chips used to transfer or move packets through the device.

Real-time packet flows may be separated by assigning ports, markings, size, type, and/or other sorting and scheduling methods to map specific traffic to a specific route or path. Using different channels for real-time and non-real-time data packets may enable counting real-time data packets and non-real-time data packets faster than having to analyze information contained within the data packets (e.g., P-bit in data packet header). Alternatively, real-time and non-real-time ports may be configured at a network node to monitor and measure real-time and non-real-time data packets, transmission times, or given path or resource utilization. Real-time and non-real-time bandwidth utilization can also be measured by the amount of time the resource is not in use by multiplying the transmission rate of the path or resource. In addition to measuring the amount of real-time and non-real-time bandwidth utilization, a second measurement to characterize the burst nature (burstiness) of the data flows may be performed. When multiple packet flows of different packetization rates and different bandwidth utilization rates are combined, an average and peak utilization occurs. One example of a measurement to characterize the burstiness of combined real-time flows includes using standard deviation of the peak from the average calculation. Other mathematical methods may be applied to characterize this ability to over-subscribe the real-time flows based on fluxuation in real-time bandwidth usage during the sampling window that calculates average bandwidth use. This added measure of burstiness can be used optionally with the real-time bandwidth usage. Because NPP data packets 122 effectively operate as a clock on an asynchronous network the transmission performance collection units 106 may monitor and/or inspect the NPP data packets 122 to determine rates of total data packets and bandwidth, real-time data packets and bandwidth, and non-real-time data packets being communicated over a network segment.

Figure 2:
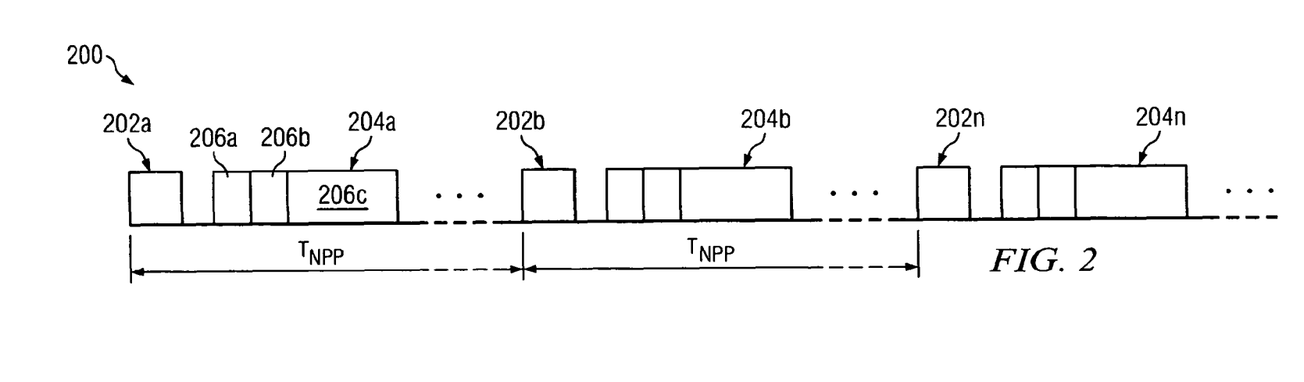
FIG. 2 is an illustration of an exemplary data packet stream including NPP data packets and communications data packets, the latter including a packet payload of either real-time or non-real-time content.

FIG. 2 is an illustration of an exemplary data packet stream 200 including NPP data packets 202a-202n (collectively 202) and communications data packets 204a-204n (collectively 204), the latter including a packet payload of either real-time or non-real-time content. Each of the data packets 204 may include a header portion including a destination address 206a and origination address 206b, among other header information, and a content or packet payload portion 206c that includes either the real-time or non-real-time data along with other transmission characteristics. Although only a single data packet 204a is shown between successive NPP data packets 202a and 202b, as understood in the art, there may be many data packets 204 that are communicated between successive NPP data packets. By determining a total number of data packets and packet size both real-time and non-real-time, communicated during a time duration (e.g., 1 second) and a number of real-time data packets communicated during that time duration, bandwidth of the total number of data packets and real-time data packets communicated over a node link may be determined. Alternatively, the amount of time a communications path or resource is not in a transmission state may be utilized to determine bandwidth and data packets communicated. Additional information, such as the distribution, burstiness, or timing of the real-time flows, may also be made available within the NPP packets 202. Together, the real-time and non-real-time packets may be used in conjunction with the link capacity to calculate the average utilization over the interval.

The bandwidth determination may be performed by monitoring the NPP data packets 202 that are collected to indicate that the time period has completed or inspecting the timestamps contained within each of the NPP data packets 202, which may be more accurate. Monitoring the NPP packets 202 may include monitoring one or more NPP packets 202. Performance calculation modules may track utilization and performance of communications paths and node segments, and create historical performance and utilization measure logs. In monitoring performance of the communications paths and node segments, each network node may utilize counters, such as counters updated by a modified ITU Y.1731 function, that may be incremented each time a data packet 204a including real-time content or non-real-time content is received. A total count of real-time and non-real-time data packets communicated to a network node during a time period defined by a certain number of NPP packets 202 may be determined by using the counters. Collected performance information may be used to detect threshold crossings to be communicated to session controllers. Other network performance information may be determined by monitoring the NPP data packets 202, including jitter, packet loss, and delay, as the NPP data packets 202 may include information indicative of time sent and counter value indicative of number of data packets sent between the previous and current NPP packet. The network performance information may further be categorized as real-time, non-real-time, and/or total network performance information (see TABLE I). In one embodiment, intermediate levels may also be established, such as near-real-time, higher priority non-real-time, etc.

Figure 3:
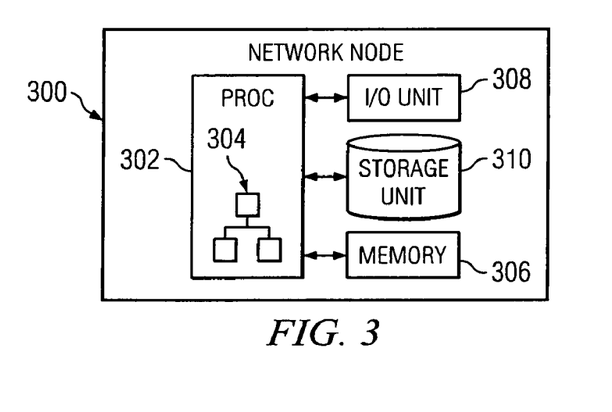
FIG. 3 is a block diagram of an exemplary network node in communication with the asynchronous communications network and configured to perform functionality in accordance with the principles of the present invention.

FIG. 3 is a block diagram of an exemplary network node 300 in communication with the asynchronous communications network and configured to perform functionality in accordance with the principles of the present invention. The network node 300 may include a processing unit 302 that includes one or more processors to execute software 304. In one embodiment, the software 304 may include module(s) that operate as a transmission performance collection function to collect network performance information. The processors 302 may be in communication with a memory 306 configured to store information, such as network performance information, in registers, bins, counters, or one or more tables, as understood in the art. The processors 302 may further be in communication with an input/output (I/O) unit 308 that is configured to communicate over one or more communications networks. I/O unit 308 may include one or more access ports (not shown). The processing unit 302 may also be in communication with a storage unit 310 that is configured to store one or more data repositories (e.g., databases) that store network performance information. The storage unit 310 may work in conjunction with the memory 306. The counters each may be dedicated to count data packets including real-time content or data packets including non-real-time content. In addition, each counter may be configured to rollover or overflow back to zero. However, the software 304 may reset each of the counters in response to receiving a counter reset command via a NPP packet or otherwise.

The network node 300 may be one of a wide variety of network nodes, including Maintenance-End-Points (MEPs) and Maintenance-Intermediate-Points (MIPs) of a Maintenance Entity Group (MEG). The MEPs may include access node devices, such as a digital subscriber line (DSL) modem, or Cable Modem and its corresponding Access node DSLAM or Cable Management Termination System (CMTS). The network node 300 may also be a mobile data element, SIP phone, Video On Demand (VOD) Server, a Media Gateway (MG) device, and/or network-to-network interface (NNI), for example. Additionally, the MEPs may include user network interfaces integrated access devices (IADs), session initiation protocol (SIP) devices, or other end-user devices or customer premises equipment (CPE). The MIPs may include bridges, switches, and routers, for example.

In one embodiment, and more specifically, the memory 306 may store network performance information in bins over a short period of time, such as seconds or minutes, and the storage unit 310 may store historical network performance information for longer periods of time, such as hours, days, weeks, or longer periods of time. By storing recent network performance information, remote network nodes (e.g., call control manager, and resource allocation systems and software) may poll the network node 300 for the network performance information and receive the network performance information in a relatively short period of time as compared to the network node 300 having to access the network performance information from the storage unit 310. Periodic updates may be retrieved via polling, event driven on a regular time basis or during unit initiation or power off, or trigger driven events may also be utilized to transmit the network performance information. The network performance information may include network performance information indicative of data packets including real-time and non-real-time content. TABLE I is an exemplary table that describes an example of network performance information as associated with real-time and non-real-time data packets. Although not illustrated, such data may be identified for communication in each direction over a particular node segment.

TABLE I

Real-Time and Non-Real-Time Network performance information

| Characteristic | Real-Time Measure | Total/Average |
|---|---|---|
| Max Packet Count | 877 | 34749 |
| Avg Packet Count | 852 | 32833 |
| Active use time | .87 | 30005 |
| Peakedness characteristic | 128 | 200 |
| Time Period | 1 s | 1 s |
| Number of RT sessions | 156 | 187 |
| Max Bandwidth (Kbps) | 877 | 34.75 |
| Avg Bandwidth (Kbps) | 852 | 32.83 |
| Bandwidth delta (rx'd-tx'd) | Calculated | Percentage |
| Packet Loss | 37 | 241 |
| Jitter | .004 s | .006 s |
| Delay | .020 s | .028 s |

Although the time period is shown as 1 second, it should be understood that anytime period may be utilized to collect the network performance information. Multiple tables or bins may be used to tabulate different time periods, such as 15 minute, 1 hour, 1 day, and so forth, may be managed for storing the same, different, or additional network performance information and, optionally, over different periods of time. In one embodiment, historical network performance information may be stored in a database to enable a call control manager the ability to predict usage of the network node 300 during an upcoming time period (e.g., next 5 second, next 2 minutes, next day, etc.). For example, if the network node is over-subscribed with users who perform real-time data downloads during the 7 pm-9 pm timeframe, then the call control manager may utilize that information to route certain calls to other network nodes that have less utilization during that timeframe. In another example, real-time and non-real-time files may be stored on a Video On Demand (VOD) server, in which case actual real-time use information could be used to load balance system requests. Many other call and network control functions may be employed by knowing the real-time and total data packet network performance information. Other statistical analysis uses of this data are possible. Another near real-time use is a graphical presentation of this data in Operator Network Management Systems (NMS).

Figure 4:
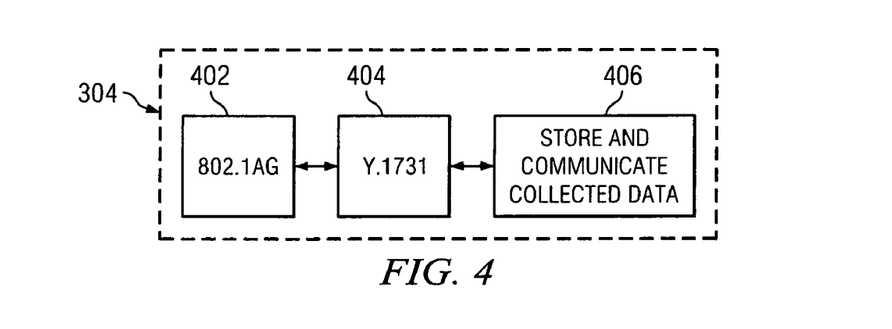
FIG. 4 is a block diagram of the software of FIG. 3 and exemplary modules configured to determine and collect network performance information in accordance with the principles of the present invention.

FIG. 4 is a block diagram of the software 304 of FIG. 3 and exemplary modules configured to determine and collect network performance information in accordance with the principles of the present invention. In collecting the network performance information, one embodiment of the network node 300 (FIG. 3) may include IEEE 802.1ag and ITU-T Y.1731 modules 402 and 404, respectively, to generate and receive IEEE 802.1ag data packets and determine network performance information associated therewith. The ITU-T Y.1731 module 304 may be a modified ITU-T Y.1731 function that is configured to collect network performance information associated with data packets containing both real-time and non-real-time content (see, for example, TABLE I). The modified ITU-T Y.1731 module 404 may be configured to collect performance information, such as maximum and average bandwidth for both real-time and total data packets along with other transmission characteristics that are being received and/or transmitted from the network node. One or more modules 406 may be configured to store and communicate collected transmission performance data. As described with respect to FIG. 3, the transmission performance data may be stored in memory and/or storage unit in one or more data repositories, such as database(s) or table(s). Communication of the collected transmission performance data may be triggered by event threshold crossings or pulled by another network system, network node, Element Management Systems, or call control manager, for example, and be performed on a routine basis or in response to a poll, audit, or event (e.g., dropping below a transmission quality threshold). In addition, although 802.1ag and ITU-T Y.1731 standards are presented for generating NPP data packets and collecting network performance information, the principles of the present invention may use other standards and protocols for collecting network performance information for real-time and total data packets being communicated over a node segment.

Figure 5:
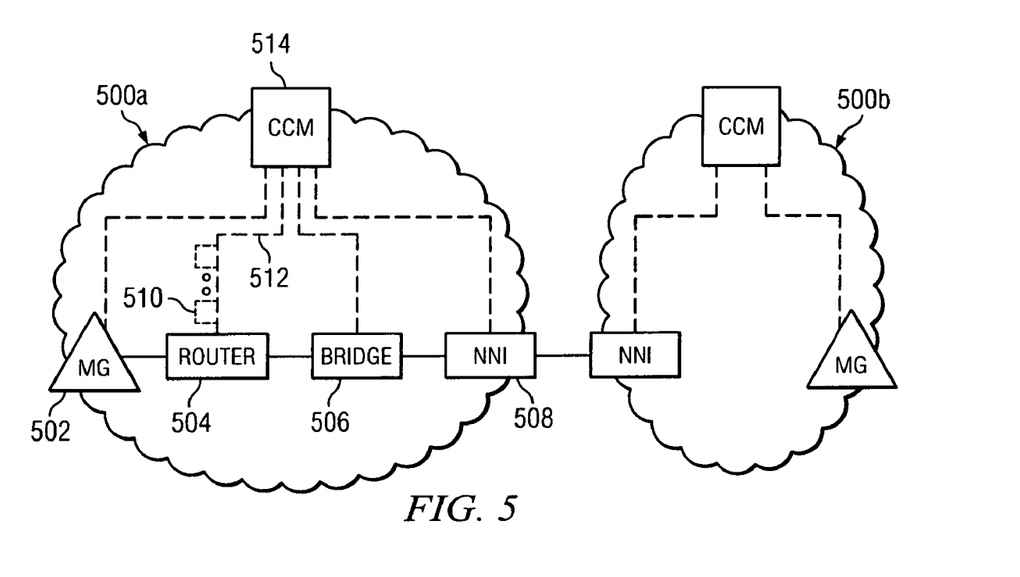
FIG. 5 is an illustration of multiple exemplary data packet networks having exemplary network nodes configured within the networks to determine and collect network performance information.

FIG. 5 is an illustration of multiple exemplary data packet networks 500a and 500b (collectively 500) having exemplary network nodes configured within the networks 500 to determine and collect network performance information. The data packet network 500a includes a media gateway 502, router 504, bridge 506, and network-to-network interface (NNI) 508. Other network nodes, such as a session border controller, switch, firewall, computer, satellite, service point or broadband node gateway (VOD server, IP service point, end-point), CPE (customer premises equipment), wireless handset, or any other packet service network node may be configured in accordance with the principles of the present invention. More specifically, each of these network nodes may be configured with modules, such as the modules described with respect to FIG. 4, which produce NPP data packets and collect network performance information for both real-time and total data packets communicated over the network. In one embodiment, a network node, such as router 504, may collect and communicate the network performance information in the form of data packets 510 via communication link 512 to a call control manager 514. The communication of the network performance information may be communicated to the call control manager 514 in response to a poll from the CCM 514, periodically, or in response to an event (e.g., packet loss dropping below a predetermined percentage). Because the CCM 514 communicates with multiple network nodes, the CCM 514 may be configured to route calls based on the network performance information collected from the network nodes.

The NPP data packets that are communicated present an opportunity for network performance information to be communicated along a network path. In one embodiment, network performance information may be collected and appended to or otherwise inserted into NPP data packets so that other network nodes can monitor performance along a virtual path. For example, the network performance information may be collected by a network node, stored in a database, and a summary may be appended with an NPP data packet and communicated to another network node to which the NPP data packet is communicated. This concatenation process may be performed at regular intervals, such as every 5 minutes, hourly, or daily, to minimize the amount of data communicated over the data packet network and stored at network nodes. The CCM 514 may collect and store historical network performance information and utilize such information to monitor trends in the network 500a and automatically alter network operation or enable network operators to reconfigure the network. For example, if it is determined that the paths to a network node or the network node itself is not operating properly, the CCM 514 may choose or establish a virtual path through different network nodes or different paths through the same node than would otherwise not have been established. As another example, if data packets are being lost, the CCM may choose to force existing and new call sessions to use CODECs of a lower compression rate on the node segment to alleviate congestion and improve call connectivity.

By utilizing NPP packets, the NPP packet to start and stop counting on may be synchronized between multiple network nodes. Given that Ethernet and IP communications protocols are two-way communications, a specially marked NPP packet may be used to identify the packet and establish a window in time for measurement of communications packets that separately or cumulatively include real-time and non-real-time content. Given a known sequence of packets, the number of packets transmitted by the far end of a network may be counted from a defined start and stop NPP packet in the packet stream.

In one embodiment an NPP or "PM counter incrementation packet" may be transmitted during a specific window of time (e.g., 0.1 seconds, 1 second, 1 minute, or any other time increment may be used). The NPP packet may contain the number of packets transmitted since the last incremental NPP packet was sent, and special increment counters for larger window metrics, such as 5 minutes, 15 minutes, 1 hour, and 24 hour increments may be used. Each NPP packet may also contain a sequence number to ensure that no NPP packets are lost, and may include other various information, such as time of day, time increments between NPP packets, packet size, or any other normal Ethernet RMON type information that may be of value.

At the far ends of a circuit formed over a packet network the system may simply "roll up" the counters using this window with the number of packets as the increment, and then may calculate an error rate, packet loss, and latency, for example, of the transmission path in the given time increments of the measurement window size. In one embodiment, the network performance information generated at each node may be appended or "stitched" to an NPP packet that is repeated at each node along the communication path. By appending the network performance information at a node to network performance information generated by other nodes, each node along a communication path may collect and use network performance information of other nodes along the communication path. In addition, a call control manager or other network management system may collect network performance information of each network node from each respective network node or from an end node that has received network performance information from NPP packets communicated thereto.

Utilizing NPP packets and synchronizing the counters at the network nodes may create a variety of features of the packet network including:

1) The ability to synchronize the counters at both ends of a packet transmission path without impeding live traffic.
2) The ability to measure error rate (ER) regardless of time in flight delays or circuit latency, which vary over time in a packet system.
3) The ability to eliminate measurement error created by packets in flight from short term performance measurements (e.g., every second or less increments and the packets in flight become significant in calculating large pipe transmission rates).
4) The ability to match counters that rollover at different counts (e.g., 1 billion or 10 billion), thereby creating more CPU processing time for the system reconciling packets sent to packets received in both directions for many services being offered.

5) The ability to remove CPU burden on an EMS or CMM system by correlating the data packets transmitted from the far end to the near end by a UNI device itself.
6) The ability to remove EMS network overlay bandwidth issue of many endpoints sending a centralized EMS system the packets transmitted and received by sending them "in-band" to the far end.

Analogous to counting vehicular traffic, if black cars are being counted and a white car with a sequence number painted on it is being sent at specific increments, the counting of communications packets may be easier as:

1) Counting can now be tied to known increments regardless of delay.
2) Small windows of time yield accurate traffic monitoring.
3) Packet loss can be calculated even if traffic starts and restarts.

Using the principles of the present invention, a number of features and applications may be available, including:

1) The synchronization packet or NPP packet could be a modified 802.1ag Y.1731 based Ethernet operations, administration and management (OAM) packet that may be transmitted 10 times per second. Alternatively, the NPP packet could be some other tagged or untagged Ethernet packet. The NPP packet may be used both on a physical port (containing the statistics for the entire port) and inside a VLAN or other Virtual Circuit with statistics on the specific traffic inside that single Ethernet Virtual Circuit.
2) Both User Network Interfaces (UNI) and Network-to-Network Interfaces (NNI) systems may transmit NPP packets at any interval.
3) Both UNI and NNI systems may be capable of receiving, reacting to with an OM counter message, and choosing to terminate or pass the packet through to the next node.
4) The system may detect a missing OM synchronization or NPP packet and react accordingly when two increments or more have been missed.
5) An alarm may indicate when the far end NPP packets are not being received. The alarm may be activated when a threshold value is crossed when a specific number of data packets are lost and logged for the duration of the data packets being lost.
6) The system may reset an OM synchronization counter and then add that information to the normal system time counters (e.g., 1 minute, 5 minute, 15 minute, 1 hour, 1 day, etc.). The first and last synchronization packet sequence numbers or some other start/stop information may be utilized to define a time period over which data packets are counted. Network Time Protocol and/or time of day markings could easily be included in the packet OM message to record long-term performance to calendar dates and times of day.
7) The number of synch packets lost may be tracked to evaluate cumulative data packet counter.
8) SNMP or other management protocols can be configured to transmit the loss of the NPP packets or synch packets to element management systems. Monitoring loss of NPP packets provides pro-active surveillance of the network Traps may be used to offload PM counter data from the element to the EMS system and archive data.
9) UNI to UNI or NNI to UNI OM messaging (service provider to customer, customer to customer), may be provided through use of collecting network performance information. The network performance information may be generated by the UNI or if generated by a customer could be passed through or terminated by any element in the network If using T1 circuitry, process may be referred to as Terminate or pass through mode. A user may monitor performance without system or network participation or the service provider UNI may send the synch packet to the user and pass it to the network UNI for counter synchronization.
10) NNI to NNI OM messaging (service provider to service provider) may be used for both physical links between network providers as an NNI service level agreement or performance engine indicator for pro-active monitoring, or subsequently it can be used in Ethernet virtual connections to monitor an Ethernet channel (VLAN, LSP, VPLS, Ethernet virtual circuit, etc.).
11) An EMS system may be aware of the counter start/stop sequences and store counter retrievals for the purpose of synchronizing the counters.
12) Using the typical RMON type information or the 802.1ag Ethernet First Mile OM packet information or another packet containing packets transmitted by size may enable conversion of the calculation to bandwidth performance per counter synch packet interval. A threshold alarm may be utilized for monitoring bandwidth performance along with the packet loss performance.
13) Jitter threshold variance may be detected based on the synch counter packet arrival differential time (i.e. jitter) and record the variance at each counter reset or rollover. Performance monitoring may also be threshold alarmed.

One or more embodiments of the present invention may be able to more accurately measure or evaluate network performance parameters, such as the amount of packets transmitted during a particular interval, the amount of packet loss during a particular interval, bandwidth performance during a particular interval, jitter threshold variance, or other suitable network performance parameters. An interval may be the length of time between two packets being received, between a start and stop time received at a network node, or any other appropriate indication of a window of transmitted data that counting can be synchronized between two nodes of a network.

Figure 6:
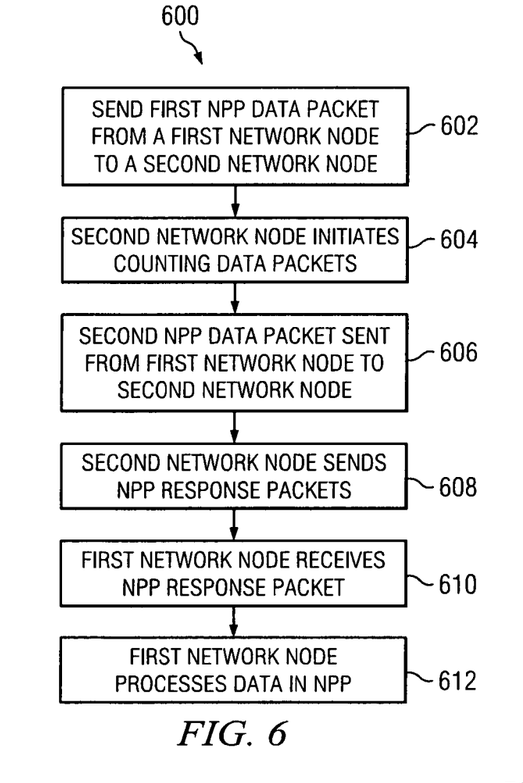
FIG. 6 is a flow diagram of an exemplary process for monitoring performance of an asynchronous network.

FIG. 6 is a flow diagram of an exemplary process 600 for monitoring performance of an asynchronous network. The process may start at step 602, where a first node of a packet network sends a data packet, such as an NPP packet, to a second node of the network. In one embodiment, the data packet is a data packet that does not include content normally used by users of the packet network. Such data packets may include control information, monitoring information, or other information useful to the operation, management, or maintenance of the network. Such data packets are sometimes referred to in the industry as Type II packets. In one embodiment, the data packets may be IEEE 802.1ag Y.1731 based Ethernet OAM packet. Alternatively, such data packets may be any other data packet previously being communicated over a packet network or a data packet specifically created for the purpose of providing functionality in accordance with the principles of the present invention. For purposes of convenience, any of such data packets shall be referred to as an interval or NPP packet. An interval packet may include a time, identifiers associated with either or both of the first and second node, and an identifier associated with the packet itself such as a packet ID or sequence number. The first network node may send NPP packets to a second network node at regular intervals.

The NPP packet may indicate the beginning of a time window or interval in which the second network node tracks network data useful to the first node in measuring or evaluating network performance parameters described above. For example, at step 604, an NPP packet may trigger the second network node to begin counting data packets, where the amount of data received may be communicated from the second network node back to the first network node in an NPP response packet, thereby marking the time of day at which the interval packet is received, or any other data useful to determine network performance.

At step 606, the first network node may send yet another NPP packet to the second network node. The NPP packet may indicate to the second network node that the prior time window or interval is completed and may also indicate the beginning of a new time window or interval.

At step 608, the second network node may send an NPP response packet to the first network node that includes network data associated with the prior time window. The second network node may use the NPP response packet to indicate the first and last packets sent during the time interval, the total number of packets sent, the total amount of data sent, the amount of different types or sizes of data packets, the time of day that the interval began and ended, or any other network data. The NPP response packet may also include identifiers associated with either or both of the first and second network node and an identifier associated with the NPP response packet itself such as a packet ID or sequence number.

At step 610, the first network node may receive the NPP response packet from the second network node. At step 612, the first network node compares the number of packets that are indicated in the NPP response packet to have been sent by the second network node during the time interval to the number of data packets received by the first network node between the receipt of the previous and current NPP response packets. Such comparison can therefore detect packet loss between network nodes or in certain types of data communicated between network nodes. The first network node may also measure variance between the times at which different interval response packets are received. The first network node may also calculate total, real-time, and/or non-real-time bandwidth during a time window.

Alternatively, the second network node may send NPP packets at regular intervals as previously described that include network performance information about the data packets or data transmitted since the last interval packet. Network data from an NPP packet may be compared by the first network node to network data associated with data packets received by the first network node since the last NPP packet. Such transmission at regular intervals may eliminate NPP packets from having to be sent from the first network node to the second network node.

The two previously described embodiments are illustrative of the use of packets to synchronize a time window or interval over which to compare network data at two network nodes that may be separated by time or distance. Headers or payloads of other packets may be used to communicate the same information and otherwise synchronize the network nodes. Such network information may be exchanged in a synchronous or asynchronous manner.

Figure 7:
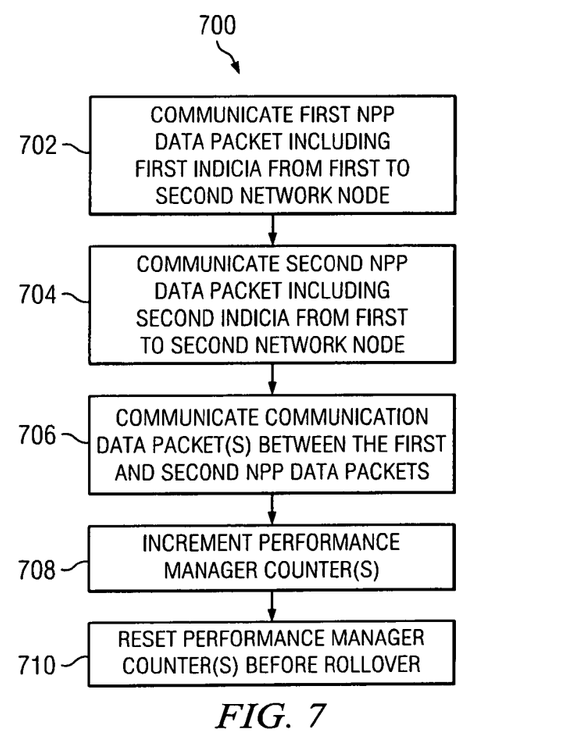
FIG. 7 is a flow chart describing another exemplary process for implementing the principles of the present invention

FIG. 7 is a flow chart describing another exemplary process 700 for implementing the principles of the present invention. The process starts at step 702, where a first network performance data packet including a first indicia may be communicated over an asynchronous network from a first network node to a second network node. At step 704, a second network performance data packet including a second indicia may be communicated from the first network node to the second network node. At step 706, at least one communications data packet may be communicated from the first network node to the second network node between the first and second network performance data packets. At least one performance manager counter at the second node may be incremented in response to receiving each communications data packet between the first and second network performance data packets at step 708. At step 710, the performance manager counter(s) may be reset before rollover of the counter with the lowest rollover value. Network performance information may be generated at the second network node in response to incrementing the at least one performance manager counter. A network performance data packet may be communicated from the second node to a third network node including data received in the second network performance data packet and network performance information generated at the second node.

The previous detailed description is of a small number of embodiments for implementing the principles of the present invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system, comprising:
    a first network node including a plurality of first performance manager counters, each of the first performance manager counters operable to count a different type of network performance information associated with data packets communicated over an asynchronous communications network; and
    a second network node including a plurality of second performance manager counters, each of the second performance manager counters operable to count a different type of network performance information associated with data packets communicated over the asynchronous communications network, said first network node configured to communicate a first network performance data packet including a first indicia to said second network node, a second network performance data packet including a second indicia to said second network node, and at least one communications data packet to said second network node between the first and second network performance data packets, said second network node incrementing at least one of the second performance manager counters in response to receiving each communications data packet between the first and second network performance data packets.

2. The system according to claim 1, wherein the first and second indicia are sequenced values indicative of the first and second network performance data packets being communicated in a sequence.

3. The system according to claim 1, wherein the first and second indicia is data representative of the first and second network performance data packets being non-communications data packets.

4. The system according to claim 1, further comprising a centralized server located on the asynchronous network and configured to communicate with each of said first and second network nodes to collect values of the performance manager counters.

5. The system according to claim 4, wherein said centralized server is further configured to communicate a message on a periodic basis to the first and second network nodes to cause each of the performance manager counters to be reset.

6. The system according to claim 4, wherein said centralized server is configured to communicate the first and second network performance packets on a periodic basis, wherein the periodic basis is less than a time for a performance manager counter having the lowest maximum count of the at least one first and second performance manager counters to rollover.

7. The system according to claim 1, wherein each of the first and second performance manager counters include a plurality of performance manager counters configured to count over different time durations.

8. The system according to claim 7, further comprising a third network node, wherein said second network node is configured to include the performance manager counter values of the first performance manager counters and corresponding performance manager counter values of the second performance manager counters in a third network performance data packet being communicated to said third network node.

9. The system according to claim 1, wherein said first network node is configured to include corresponding performance manager counter values of the first performance manager counters in the second network performance data packet being communicated to said second network node.

10. The system according to claim 9, wherein the third network performance data packet includes the second indicia received in the second network performance data packet.

11. The system according to claim 9, wherein said third network node is configured to accumulate performance manager counter values received in the third network performance data packet with corresponding previously received performance manager counter values.

12. The system according to claim 1, wherein the first and second network performance packets are modified IEEE 802.1ag data packets.

13. The system according to claim 1, wherein the at least one first and second performance manager counters are modified IEEE ITU Y.1731 counters.

14. The system according to claim 1, wherein the at least one first and second performance manager counters each include separate counters that accumulate a number of real-time and non-real-time data packets being communicated between the first and second network performance data packets, respectively.

15. A method, comprising:
communicating a first network performance data packet including a first indicia over an asynchronous network from a first network node to a second network node;
communicating a second network performance data packet including a second indicia from the first network node to the second network node;
communicating at least one communications data packet from the first network node to the second network node between the first and second network performance data packets; and
incrementing, at the second network node, at least one performance manager counter of a plurality of performance manager counters operable to count a different type of network performance information in response to receiving each communications data packet between the first and second network performance data packets.

16. The method according to claim 15, wherein communicating the first and second indicia includes communicating first and second indicia that are sequenced values indicative of the first and second network performance data packets being communicated in a sequence.

17. The method according to claim 15, wherein communicating the first and second indicia is data representative of the first and second network performance data packets being non-communications data packets.

18. The method according to claim 15, further comprising communicating with each of the first and second network nodes to collect values of the performance manager counters.

19. The method according to claim 18, further comprising communicating a message on a periodic basis to the first and second network nodes to cause each of the performance manager counters to be reset.

20. The method according to claim 15, wherein communicating a message on a periodic basis is performed less than a time for a maximum count of the at least one performance manager counter to be reached.

21. The method according to claim 15, further comprising counting, by each of the performance manager counters, over different time durations.

22. The method according to claim 15, further comprising:
including corresponding performance manager counter values of the performance manager counters in a third network performance data packet; and
communicating the third network performance data packet from the second network node to a third network node.

23. The method according to claim 22, wherein including the corresponding performance manager counter values in the third network performance data packet further includes including the second indicia received in the second network performance data packet into the third network performance data packet.

24. The method according to claim 22, further comprising accumulating performance manager counter values received in the third network performance data packet with corresponding previously received performance manager counter values.

25. The method according to claim 15, wherein communicating the first and second network performance packets includes communicating modified IEEE 802.1ag data packets.

26. The method according to claim 15, wherein incrementing the performance manager counters includes incrementing modified ITU Y.1731 counters.

27. The method according to claim 15, further comprising:
incrementing a first performance manager counter to accumulate a number of data packets including real-time content being communicated between the first and second network performance data packets; and
incrementing a second performance manager counter to accumulate a number of data packets including non-real-time content being communicated between the first and second performance data packets.

* * * * *